United States Patent
Mizukoshi

(10) Patent No.: US 8,428,064 B2
(45) Date of Patent: Apr. 23, 2013

(54) WIRELESS COMMUNICATION DEVICE, MAC ADDRESS MANAGEMENT SYSTEM, WIRELESS COMMUNICATION METHOD, AND PROGRAM

(75) Inventor: Yasuhiro Mizukoshi, Tokyo (JP)

(73) Assignee: NEC Corporation, Tokyo (JP)

(*) Notice: Subject to any disclaimer, the term of this patent is extended or adjusted under 35 U.S.C. 154(b) by 1420 days.

(21) Appl. No.: 11/683,337

(22) Filed: Mar. 7, 2007

(65) Prior Publication Data

US 2007/0211653 A1  Sep. 13, 2007

(30) Foreign Application Priority Data

Mar. 10, 2006  (JP) .................... 2006-065953

(51) Int. Cl.
*H04L 12/56* (2006.01)

(52) U.S. Cl.
USPC ........... 370/393; 370/392; 370/475; 370/329; 370/338; 370/341; 455/410; 455/411; 455/509; 455/435.1; 455/432.3

(58) Field of Classification Search .................. 370/312, 370/315, 332, 349, 389, 397, 392, 465, 475, 370/338, 328, 322, 329, 393, 432, 341; 709/245, 709/203, 222, 226, 248, 221, 228; 455/435.1, 455/450, 509, 410–411, 550.1, 556.2, 433, 455/436, 561, 420, 43, 2.3, 432.1; 713/155, 713/158, 168, 171; 380/247, 255, 277

See application file for complete search history.

(56) References Cited

U.S. PATENT DOCUMENTS

| | | | |
|---|---|---|---|
| 5,644,576 A * | 7/1997 | Bauchot et al. ............... | 370/437 |
| 5,708,655 A * | 1/1998 | Toth et al. ..................... | 370/313 |
| 6,079,034 A * | 6/2000 | VanZante et al. .............. | 714/48 |
| 6,240,513 B1 * | 5/2001 | Friedman et al. ............. | 713/152 |
| 6,256,300 B1 * | 7/2001 | Ahmed et al. ................. | 370/331 |
| 6,463,154 B1 * | 10/2002 | Patel .............................. | 380/270 |
| 6,567,396 B1 * | 5/2003 | Pohjanvouri et al. ......... | 370/349 |
| 6,570,857 B1 * | 5/2003 | Haartsen et al. .............. | 370/312 |
| 6,580,704 B1 * | 6/2003 | Wellig et al. .................. | 370/338 |
| 6,609,152 B1 * | 8/2003 | Ono ............................... | 709/222 |
| 6,832,262 B2 * | 12/2004 | Cromer et al. ................ | 709/245 |
| 7,359,989 B2 * | 4/2008 | Orava et al. ................... | 709/245 |
| 7,480,939 B1 * | 1/2009 | Nessett et al. ................. | 726/22 |
| 2004/0006642 A1 * | 1/2004 | Jang et al. ..................... | 709/245 |
| 2007/0019609 A1 * | 1/2007 | Anjum .......................... | 370/349 |

FOREIGN PATENT DOCUMENTS

| | | |
|---|---|---|
| EP | 1 379 029 A1 | 1/2007 |
| JP | 2000-138692 A | 5/2000 |
| JP | 2004-040806 A | 2/2004 |
| WO | WO 03/061203 A1 | 7/2003 |

* cited by examiner

*Primary Examiner* — Vladimir Magloire
*Assistant Examiner* — Babar Sarwar
(74) *Attorney, Agent, or Firm* — Sughrue Mion, PLLC

(57) ABSTRACT

A MAC address management system acquires code data obtained by encoding a temporary MAC address that can be temporarily used and decodes the acquired code data to perform wireless communication. The MAC address management system includes a MAC distributing server device in which a temporary MAC address which can be temporarily used is stored and a wireless communication device that acquires the temporary MAC address from the MAC distributing server device and performs wireless communication by using the acquired temporary MAC address, the wireless communication device acquires code data obtained by encoding the temporary MAC address from the MAC distributing server device, decodes the acquired code data, and performs wireless communication by using the decoded temporary MAC address.

15 Claims, 9 Drawing Sheets

F I G. 2
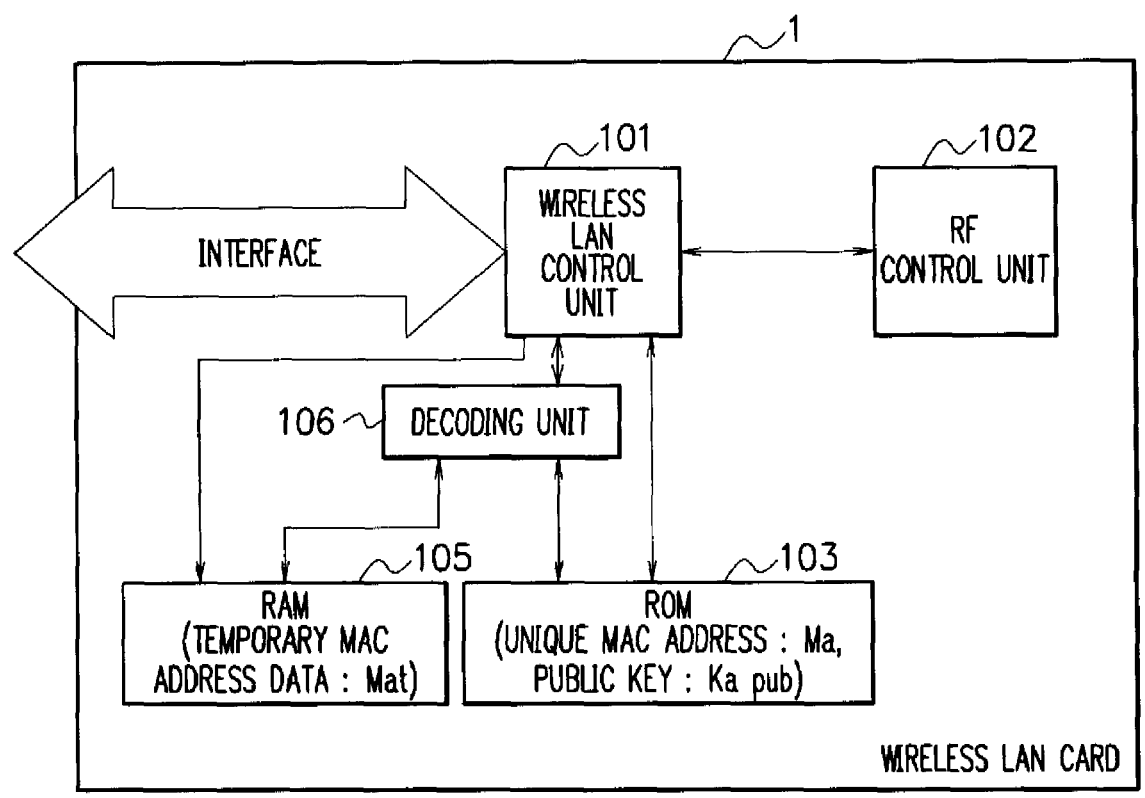

WIRELESS COMMUNICATION DEVICE, MAC ADDRESS MANAGEMENT SYSTEM, WIRELESS COMMUNICATION METHOD, AND PROGRAM

BACKGROUND OF THE INVENTION

1. Field of the Invention

The present invention relates to a wireless communication device, a MAC address management system, a wireless communication method, and a computer program and, more particularly, to a wireless communication device, a MAC address management system, a wireless communication method, and a computer program that perform wireless communication by using a temporary MAC address which can be temporarily used.

2. Description of the Related Art

A conventional wireless LAN card (100), as shown in FIG. 8, includes a wireless LAN control unit (101), an RF (Radio Frequency) control unit (102) and a ROM (Read Only Memory) (103).

The wireless LAN control unit (101) is to control various functions in the wireless LAN card (100): the unit 101 performs interface control for a wireless communication device such as a PC on which the wireless LAN card (100) is loaded to perform wireless communication, and performs wireless communication by using a unique MAC address stored in the ROM (103). The RF control unit (102) is to control wireless communication with an external device. The ROM (103) is to store a unique MAC address that is an identification number unique to each wireless LAN card allocated when a card was manufactured.

Since the wireless LAN card (100) shown in FIG. 8 performs wireless communication by using the unique MAC address stored in the ROM (103), once radio waves of the wireless communication are intercepted, the unique MAC address may be revealed from the intercepted radio waves. Consequently, an interceptor of the MAC address could specify a user of the wireless LAN card (100) on the basis of the unique MAC address, and monitor a behavior of the user who uses the wireless LAN card (100). In this case, the privacy of the user who uses the wireless LAN card (100) cannot be protected.

In order to solve the above problem, for example, as shown in FIG. 9, a temporary MAC address that can be temporarily used is written in a flash memory 104, and the written temporary MAC address is used to perform wireless communication. In this way, the wireless communication can be performed without using the unique MAC address stored in the ROM (103) whereby the privacy of a user of the wireless LAN card (100) can be protected.

In this case, however, temporary MAC addresses can be sequentially updated so that when wireless communication is performed with the updated temporary MAC addresses, uniqueness of temporary MAC address cannot be maintained. There is also a danger that a false temporary MAC address will be written in the flash memory (104). Therefore, when the temporary MAC address is designed to be written in the flash memory (104) as shown in FIG. 9, another problem arises that there will be interference on wireless communication.

For this reason, wireless communication is desired to be performed by using a temporary MAC address different from a unique MAC address stored in the ROM (103) to protect the privacy of a user, and the uniqueness of temporary MAC address is maintained, so that interference is prevented on wireless communication.

As related art documents, Patent document 1 (Japanese Patent Application Laid-Open No. 2004-40806) discloses a wireless LAN system that secures the anonymity of a user. The wireless LAN system comprises (a) a wireless connection node that generates at least one temporary address set in correspondence with a MAC address of each wireless terminal, and uses as a target address a temporary address selected from the temporary address set, and (b) at least one wireless terminal that receives a temporary address set that was generated at the wireless connection node and corresponded to its own MAC address, and uses as a source address a temporary address selected from the received temporary address set.

Patent document 2 (Japanese Patent Application Laid-Open No. 2000-138692) discloses a MAC address management device that infallibly and safely gives a MAC address to a network interface device. In the system of Patent document 2, a network interface device forwards a supply request of MAC address information to a MAC address database server; the MAC address database server reads out a MAC address from a MAC address file and transmits the MAC address to the network interface device; the network interface device writes the MAC address in a built-in memory.

Though in Patent document 1 a wireless terminal receives a temporary address set generated at a wireless connection node, and a temporary address selected from the temporary address set is used as a source address, Patent document 1 does not disclose that code data which is an encoded temporary MAC address is obtained from a server device and then decoded for wireless communication.

In Patent document 2 the MAC address database server transmits a MAC address to the network interface device and writes the MAC address in the built-in memory. However, Patent document 2 does not disclose that code data, which is an encoded temporary MAC address, is obtained from a server device and then decoded for wireless communication.

SUMMARY OF THE INVENTION

In consideration of the above circumstances, provided are a wireless communication device, a MAC address management system, a wireless communication method, and a program that obtains code data, which is an encoded temporary MAC address, from a server device and decodes the code data to perform wireless communication.

In order to achieve the above objective, the wireless communication device acquires a temporary MAC address from a distributing server device storing a temporary MAC address that is temporarily used and performs wireless communication using the temporary MAC address. The device includes a code data acquiring section that acquires code data being an encoded temporary MAC address from the distributing server device; and a wireless communication section that decodes the code data, and performs wireless communication using a decoded temporary MAC address.

The wireless communication device may include a code data storing section that stores the code data, wherein the wireless communication section decodes the code data stored in the code data storing section and performs wireless communication using a decoded temporary MAC address.

The wireless communication device may include a public key storing section that stores a public key to decode code data, and the wireless communication section decodes the code data using the public key, and performs wireless communication using a decoded temporary MAC address.

In the wireless communication device, the code data acquiring unit may acquire the code data and expiration date information representing a period during which the code data is valid from the distributing server device, and the wireless communication section decodes the code data when based on the expiration date information, the code data is judged valid, and performs wireless communication using a decoded temporary MAC address.

In the wireless communication device, the wireless communication section may acquire the code data from the distributing server device again when based on the expiration date information, the code data is judged invalid.

The wireless communication device may include a wireless LAN medium that controls wireless communication, and the wireless LAN medium has a code data storing section, a public key storing section, and a wireless communication section.

In the wireless communication device, the wireless LAN medium may have a unique MAC address storing section that stores a unique MAC address unique to the wireless LAN medium, and the wireless communication section has a first communication section to perform wireless communication using the unique MAC address and a second communication section to perform wireless communication using the temporary MAC address.

In the wireless communication device, the distributing server device may allocate a temporary MAC address to each unique MAC address unique to a wireless LAN medium to perform storage management, and the code data acquiring section acquires code data being an encoded temporary MAC address allocated to each unique MAC address from the distributing server device.

In the wireless communication device, the distributing server device may allocate a temporary MAC address to each serial number unique to a wireless LAN medium to perform storage management, and the code data acquiring section acquires code data being an encoded temporary MAC address allocated to each serial number from the distributing server device.

A MAC address management system is a MAC address management system including a distributing server device that stores a temporary MAC address that is temporarily used, and a wireless communication device that acquires the temporary MAC address from the distributing server device and performs wireless communication using the temporary MAC address. The wireless communication further comprises a code data acquiring section that acquires code data being an encoded temporary MAC address from the distributing server device, and a wireless communication section that decodes the code data, and performs wireless communication using a decoded temporary MAC address.

In the MAC address management system, the wireless communication device may have a code data storing section that stores the code data, and the wireless communication section decodes the code data when wireless communication is performed using the temporary MAC address, and performs wireless communication using a decoded MAC address.

In the MAC address management system, the wireless communication device may have a public key storing section that stores a public key to decode the code data, and the wireless communication section decodes the code data with the public key and performs wireless communication using a decoded temporary MAC address.

In the MAC address management system, the wireless communication device may acquire the code data and expiration date information representing a period during which the code data is valid from the distributing server device, and the wireless communication unit decodes the code data when based on the expiration date information, the code data is judged valid, and performs wireless communication using the decoded temporary MAC address.

In the MAC address management system, the wireless communication device may acquire the code data from the distributing server device again when based on the expiration date information, the code data is judged invalid.

In the MAC address management system, the wireless communication device may have a wireless LAN medium that controls wireless communication, the wireless LAN medium has a code data storing section, a public key storing section, and a wireless communication section.

In the MAC address management system, the wireless LAN medium may have a unique MAC address storing section that stores a unique MAC address unique to the wireless LAN medium, and the wireless communication section has a first communication section to perform wireless communication using the unique MAC address and a second communication section to perform wireless communication using the temporary MAC address.

In the MAC address management system, the distributing server device may allocate a temporary MAC address to each unique MAC address unique to a wireless LAN medium to perform storage management, and the code data acquiring section acquires code data being an encoded temporary MAC address allocated to each unique MAC address from the distributing server device.

In the MAC address management system, the distributing server device may allocate a temporary MAC address to each serial number unique to a wireless LAN medium to perform storage management, and the code data acquiring section acquires code data obtained by encoding the temporary MAC address allocated to each serial number from the distributing server device.

A wireless communication method is a wireless communication method for a wireless communication device that acquires a temporary MAC address from a distributing server device storing a temporary MAC address that is temporarily used, and performs wireless communication using the acquired temporary MAC address, including a code data acquiring step for acquiring code data being an encoded temporary MAC address from the distributing server device, and a wireless communication step of decoding the code data and performing wireless communication using a decoded temporary MAC address.

The wireless communication method may further comprises the steps of storing the code data in a code data storing section, wherein in the wireless communication step, when wireless communication is performed using the temporary MAC address, the code data stored in the code data storing section is decoded, and the wireless communication is performed using a decoded temporary MAC address.

In the wireless communication method, in the wireless communication step, the code data may be decoded with a public key stored in a public key storing section, and a decoded temporary MAC address is used for the wireless communication.

In the wireless communication method, in the code data acquiring step, expiration date information representing a period during which the code data is valid may be acquired together with the code data from the distributing server device, and, in the wireless communication step, the code data is decoded if based on the expiration date information, the code data is judged valid, and a decoded temporary MAC address is used for the wireless communication.

In the wireless communication method, in the wireless communication step, the code data is acquired from the distributing server device again if the code data is judged invalid based on the expiration date information.

In the wireless communication method, the wireless communication step may be established by the wireless LAN medium in the wireless communication device where the wireless LAN medium controls the wireless communication.

In the wireless communication method, in the wireless communication step, the wireless communication is established using a unique MAC address unique to the wireless LAN medium or the temporary MAC address.

In the wireless communication method, the distributing server device may allocate a temporary MAC address to each unique MAC address unique to a wireless LAN medium to perform storage management, and, in the code data acquiring step, code data obtained by encoding the temporary MAC address allocated to each unique MAC address is acquired from the distributing server device.

In the wireless communication method, the distributing server device allocates a temporary MAC address to each serial number unique to a wireless LAN medium to perform storage management, and, in the code data acquiring step, code data obtained by encoding the temporary MAC address allocated to each serial number is acquired from the distributing server device.

A wireless communication program is a wireless communication program that causes a wireless communication device that acquires a temporary MAC address from a distributing server device storing a temporary MAC address that is temporarily used, and performs wireless communication using the acquired temporary MAC address, to perform a code data acquiring process for acquiring code data obtained by encoding the temporary MAC address from the distributing server device, and a wireless communication process for decoding the code data acquired in the code data acquiring step and performing wireless communication by using the decoded temporary MAC address.

The wireless communication program may further cause the wireless communication device to perform a code data storing process for storing the code data, and decoding the code data when wireless communication is performed, and performing wireless communication by using a decoded temporary MAC address.

The wireless communication program, in the wireless communication process, the code data is decoded by using a public key stored in a public key storing section, and wireless communication is performed by using a decoded temporary MAC address.

In the wireless communication program, in the code data acquiring process, expiration date information representing a period during which the code data is valid is acquired together with the code data from the distributing server device, and, in the wireless communication process, the code data is decoded based on the expiration date information, the code data is valid, and wireless communication is performed by using a decoded temporary MAC address.

In the wireless communication program, in the wireless communication process, the code data is acquired from the distributing server device again when based on the expiration date information, the code data is judged invalid.

In the wireless communication program, the wireless communication device has a wireless LAN medium that controls wireless communication, the wireless LAN medium has a code data storing section and a public key storing section, and the wireless communication process is executed by the wireless LAN medium.

In the wireless communication program, the wireless LAN medium has a unique MAC address storing section that stores a unique MAC address unique to the wireless LAN medium, and in the wireless communication process, wireless communication is established by using the unique MAC address or the temporary MAC address.

In the wireless communication process, the distributing server device may allocate a temporary MAC address to each unique MAC address unique to a wireless LAN medium to perform storage management, and, in the code data acquiring process, code data obtained by encoding the temporary MAC address allocated to each unique MAC address is acquired from the distributing server device.

In the wireless communication program, the distributing server device may allocate a temporary MAC address to each serial number unique to a wireless LAN medium to perform storage management, and, in the code data acquiring process, code data obtained by encoding the temporary MAC address allocated to each serial number is acquired from the distributing server device.

According to the present invention, code data obtained by encoding a temporary MAC address that can be temporarily used is acquired from a distributing server device, the acquired code data is decoded, and wireless communication is performed using a decoded temporary MAC address. In this manner, the wireless communication is performed using a temporary MAC address different from the unique MAC address to maintain the secrecy to an interceptor. For this reason, the privacy of a user can be protected. Furthermore, code data obtained by encoding the temporary MAC address is acquired from a distributing server device, and the acquired code data is decoded, and wireless communication is performed by using the decoded temporary MAC address so that the uniqueness of the temporary MAC address can be maintained. Therefore, cross talk in wireless communication can be prevented.

BRIEF DESCRIPTION OF THE DRAWINGS

FIG. 2 is a diagram showing an internal configuration of a wireless LAN card (1) loaded on a wireless communication device (10);

DETAILED DESCRIPTION OF THE PREFERRED EMBODIMENTS

Figure 1:
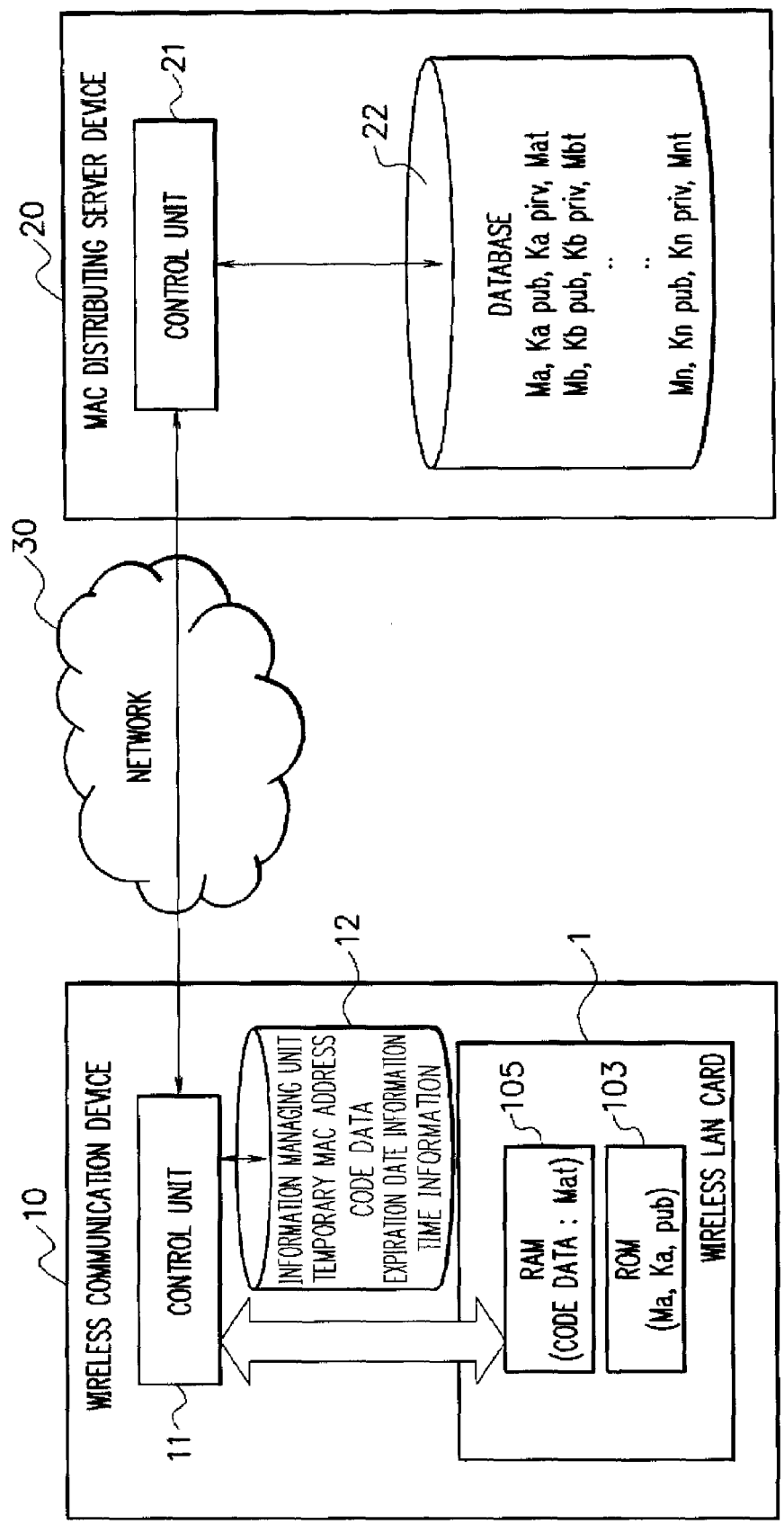
FIG. 1 is a diagram showing a system configuration of a MAC address management system according to an embodiment.

Characteristic features of a MAC address management system according to preferred embodiments are described below with reference to FIG. 1.

The MAC address management system includes a MAC distributing server apparatus (20) that stores a temporary MAC address (Mat) which can be temporarily used and a wireless communication apparatus (10) which acquires the temporary MAC address (Mat) from the MAC distributing server apparatus (20) and performs wireless communication by using the temporary MAC address (Mat).

The wireless communication apparatus (10) acquires code data obtained by encoding the temporary MAC address (Mat) from the MAC distributing server apparatus (20), decodes the acquired code data, and performs wireless communication by using the decoded temporary MAC address (Mat).

The wireless communication apparatus (10) performs wireless communication by using the temporary MAC address (Mat) different from a unique MAC address (Ma) to maintain the secrecy to an interceptor. For this reason, the privacy of a user can be protected.

The code data is acquired from the MAC distributing server apparatus (20), the acquired code data is decoded, and wireless communication is performed by using the decoded temporary MAC address (Mat), so that the uniqueness of the temporary MAC address (Mat) can be maintained. For this reason, cross talk in wireless communication can be prevented. The MAC address management system will be described below in detail with reference to the accompanying drawings.

The MAC address management system has a configuration in which a wireless communication apparatus (10) on which a wireless LAN card (1) is loaded establishes communication with a MAC distributing server apparatus (20) through a network (30). The configuration of the network (30) is not limited to a specific configuration. That is, any network configuration in which the wireless communication apparatus (10) and the MAC distributing server apparatus (20) exchange information can be applied.

<Wireless Communication Apparatus 10>

The wireless communication apparatus (10) performs wireless communication through an access point, and has a wireless LAN card (1) loaded thereon to perform wireless communication. The wireless communication device (10) includes a control unit (11) and an information managing unit (12). In a RAM (105) of the wireless LAN card (1), code data obtained by encoding a temporary MAC address (Mat) is written, and the code data is stored in the RAM (105). In the ROM (103), a unique MAC address (Ma), which is unique to the wireless LAN card (1), and a public key (Ka pub) to decode the code data in the RAM (105) are stored. The unique MAC address (Ma) and the public key (Ka pub) are allocated beforehand (for example, when a card is made) and stored in the ROM (103).

The information managing unit (12) stores and manages the code data, expiration date information, and time information. The expiration date information represents a date until which the temporary MAC address (Mat) can be used by the wireless communication device (10). The time information represents the current time. The time information is updated to synchronize the time of the wireless communication device (10) with the time of the MAC distributing server device (20).

The control unit (11) consequently performs various control operations in the wireless communication device (10) and accesses the MAC distributing server device (20) to obtain the code data from the MAC distributing server apparatus (20). The control unit (11) performs various control operations together with the wireless LAN card (1) to perform wireless communication.

<MAC Distributing Server Device 20>

The MAC distributing server device (20) includes a control unit (21) and a database (22).

The database (22) stores and manages unique MAC addresses (Ma to Mn), which is unique to the wireless LAN card (1), public keys (Ka pub to Kn pub), private keys (Ka priv to Kn priv), and temporary MAC addresses (Mat to Mnt). The stored data are associated with each other.

The control unit (21) distributes code data obtained by encoding the temporary MAC addresses (Mat to Mnt) to the wireless communication device (10). The control unit (21) encodes the temporary MAC addresses (Mat to Mnt) by using the private keys (Ka priv to Kn priv) to form code data of the temporary MAC addresses (Mat to Mnt). The formed code data of the temporary MAC addresses (Mat to Mnt) are distributed to the wireless communication device (10).

The detailed configuration of the wireless LAN card (1) loaded into the wireless communication device (10) will be described below with reference to FIG. 2.

The wireless LAN card (1) includes the wireless LAN control unit (101), an RF (Radio Frequency) control unit (102), a ROM (103), a RAM (105), and a combining unit (106).

The wireless LAN control unit (101) controls various functions in the wireless LAN card (1). The wireless LAN control unit (101) performs interface control for a wireless communication device such as a PC on which the wireless LAN card (1) is loaded to perform wireless communication, performs wireless communication by using the unique MAC address (Ma) stored in the ROM (103), decodes in the decoding unit (106) code data of the temporary MAC address (Mat) stored in the RAM (105), and performs wireless communication by using the decoded temporary MAC address (Mat).

The RF control unit (102) control wireless communication with an external device. The ROM (103) stores unique MAC addresses (Ma) unique to each device allocated in advance and a public key (Ka pub).

The RAM (105) stores code data of the temporary MAC address (Mat), which can be temporarily used.

The decoding unit (106) decodes the code data of the temporary MAC address (Mat) stored in the RAM (105) by using the public key (Ka pub) stored in the ROM (103) to generate the temporary MAC address (Mat).

Figure 3:
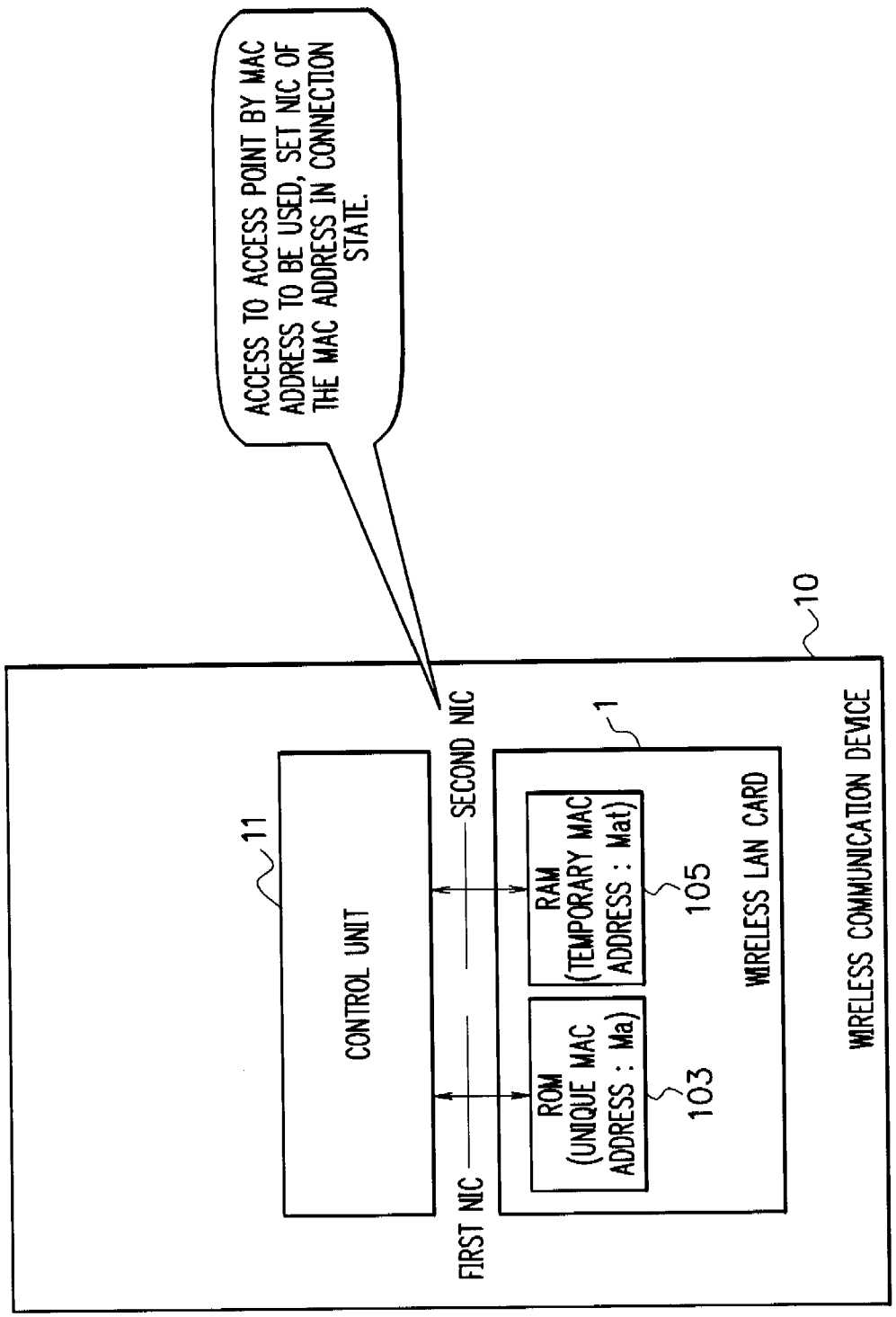
FIG. 3 is a diagram for explaining a state obtained when a unique MAC address (Ma) and a temporary MAC address (Mat) are provided to the wireless communication device (10) as different NICs (Network Interface Cards)

The wireless LAN card (1), as shown in FIG. 3, provides the unique MAC address (Ma) and the temporary MAC address (Mat) to the wireless communication device (10) as different NICs (Network Interface Cards) to switch connection states of the NICs depending on MAC addresses used by the wireless communication device (10). For example, as shown in FIG. 3, when the wireless communication device (10) accesses an access point by using the unique MAC address (Ma), switching control is performed to maintain a connection state between a first NIC and the control unit (11). When the wireless communication device (10) accesses an access point by using the temporary MAC address (Mat), switching control is performed to maintain a connection state between a second NIC and the control unit (11).

Figure 4:
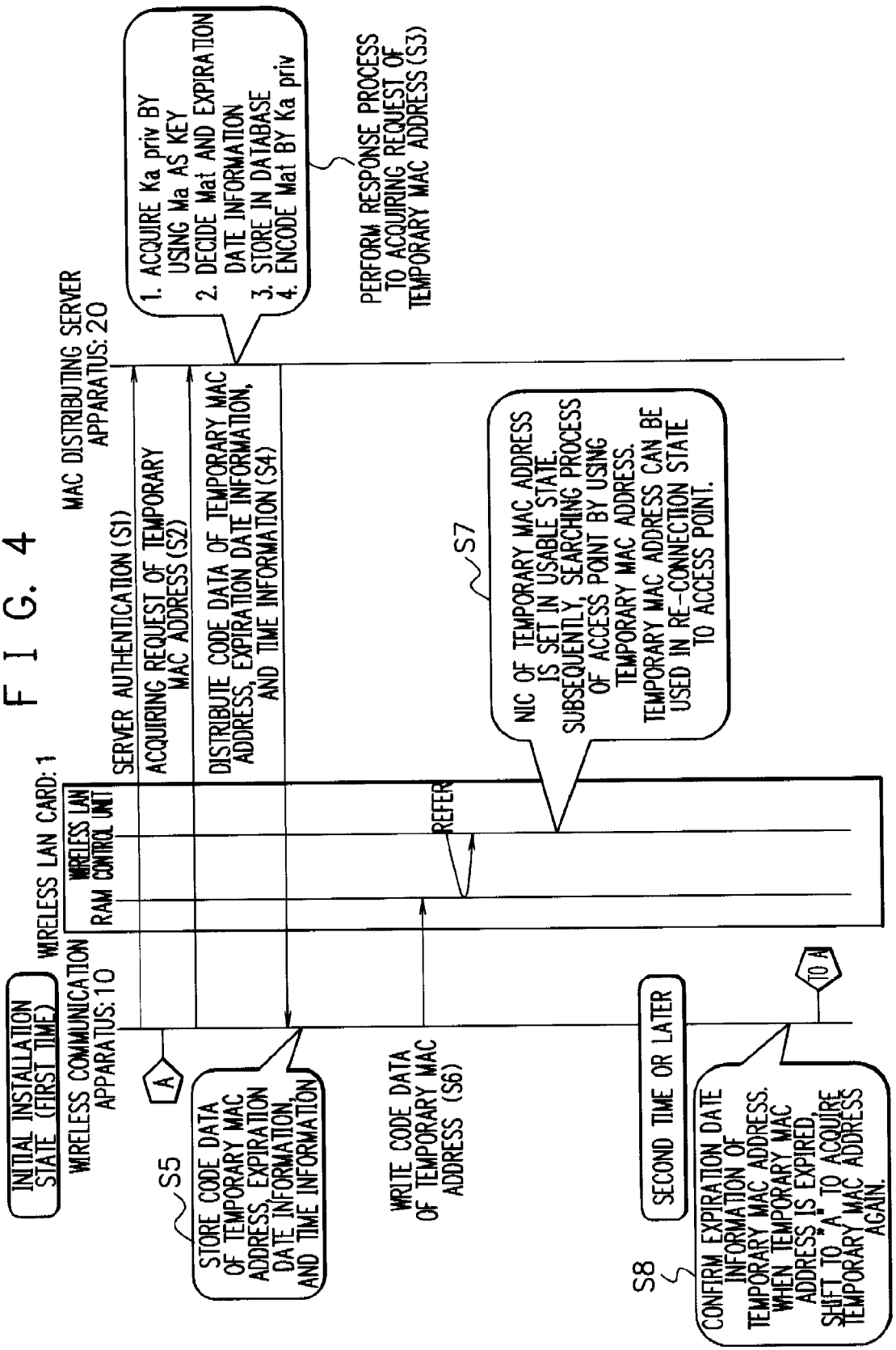
FIG. 4 is a first diagram showing a series of processing operations in the MAC address management system.

A series of processing operations in the MAC address management system will be described with reference to FIGS. 1 and 4.

For the wireless communication device (10) to use the temporary MAC address, the wireless communication device (10) is connected to the MAC distributing server device (20) to perform server authentication (step S1).

For this reason, the control unit (11) of the wireless communication device (10) acquires the unique MAC address (Ma) stored in the ROM (103) of the wireless LAN card (1)

and transmits the acquired unique MAC address (Ma) to the MAC distributing server device (20) to perform server authentication.

The control unit (21) refers to the database (22) on the basis of the unique MAC address (Ma) received from the wireless communication device (10). When the unique MAC address (Ma) has been registered in the database (22), the control unit (21) allows the temporary MAC address (Mat) to be used. When the unique MAC address (Ma) has not been registered in the database (22), the control unit (21) does not allow the temporary MAC address (Mat) to be used.

When the control unit (11) of the wireless communication apparatus (10) determines to request a temporary MAC address, the control unit (11) reads out a unique MAC address (Ma) allocated to each wireless LAN card (1) from the ROM (103) to transmit the acquiring request of the temporary MAC address together with the unique MAC address (Ma) (step S2).

Conditions for determining that the control unit (11) performs the acquiring request of a temporary MAC address are: for example, (a) it is determined that code data of a temporary MAC address is not present in the RAM (105) of the wireless LAN card (1); (b) it is determined that after a certain (predetermined) period of time, the term for use of a temporary MAC address stored in the RAM (105) expires; (c) it is determined that an acquiring request is made by a user of the wireless communication device (10). The conditions to determine an acquiring request of a temporary MAC address are not limited to the above conditions. The system can be structured such that the control unit (11) performs the acquiring request of the temporary MAC address under other conditions.

When the MAC distributing server device (20) determines that an acquiring request of a temporary MAC address is sent from the wireless communication device (10), the control unit (21) performs a response process to the acquiring request (step S3). In this process, the control unit (21) refers to the database (22) on the basis of the unique MAC address (Ma) transmitted from the wireless communication device (10); acquires the private key (Ka priv) corresponding to the unique MAC address (Ma); decides a temporary MAC address (Mat) that is allocated to the wireless communication device (10), and an expiration date when the temporary MAC address (Mat) becomes invalid; registers the temporary MAC address (Mat) in the database (22) in association with the unique MAC address (Ma) as shown in FIG. 1; and encodes the temporary MAC address (Mat) to generate the code data of the temporary MAC address.

The control unit (21) distributes the code data of the temporary MAC address, the expiration date information, and the time information to the wireless communication device (10) (step S4).

When the wireless communication device (10) receives the code data of the temporary MAC address, the expiration date information, and the time information from the MAC distributing server device (20), the control unit (11) stores the code data, the expiration date information, and the time information in the information managing unit (12) (step S5).

In this manner, the control unit (11) updates the time information stored in the information managing unit (12) on the basis of the time information acquired from the MAC distributing server device (20) to synchronize the time information of the wireless communication device (10) with the time information of the MAC distributing server device (20).

The control unit (11) writes in the RAM (105) the code data of the temporary MAC address stored in the information managing unit (12) (step S6).

In this manner, the wireless communication device (10) can perform wireless communication by using a temporary MAC address (Mat) different from a unique MAC address (Ma) stored in the ROM (103) of the wireless LAN card (1). The wireless communication device (10) can perform wireless communication using the NIC of the temporary MAC address with a pnp (Plug and Play) function or using the NIC of the unique MAC address (step S7).

When a user performs wireless communication by using a temporary MAC address (Mat), the control unit (11) requests the wireless LAN control unit (101) of the wireless LAN card (1) to use the temporary MAC address, and the wireless LAN control unit (101) requests the decoding unit (106) to perform a decoding process. The unit (106) reads out code data of the temporary MAC address (Mat) written in the RAM (105) and the public key (Ka pub) stored in the ROM (103), decodes the code data of the temporary MAC address (Mat) with the public key (Ka pub), and generates the temporary MAC address (Mat). The wireless LAN control unit (101) performs a searching process for an access point by using the decoded temporary MAC address (Mat). The wireless LAN control unit (101) performs switching control to maintain a connection state between the NIC of the temporary MAC address and the control unit (11).

The timing at which the control unit (11) writes the code data of the temporary MAC address in the RAM (105) of the wireless LAN card (1) is not limited to a specific timing. The timing may be at the initial installation. If the temporary MAC address is not used, the code data of the temporary MAC address may be not written in the RAM (105). Namely, it is sufficient to have the code data of the temporary MAC address in the RAM (105) before the wireless communication is performed with the temporary MAC address.

The control unit (11) determines, on the basis of the expiration date information stored in the information managing unit (12), whether the temporary MAC address is valid when the searching process for an access point is performed by using the temporary MAC address (Mat) written in the RAM (105). When the temporary MAC address is valid, wireless communication is performed with the temporary MAC address (Mat). When it is determined that the term of the temporary MAC address has expired, the control unit (11) establishes communication with the MAC distributing server device (20) again and transmits an acquiring request of a temporary MAC address to require the code data of the temporary MAC address from the MAC distributing server device (20) (step 8).

In this manner, the wireless communication device (10) obtains the code data from the MAC distributing server device (20) and writes the obtained code data in the RAM (105) in the wireless LAN card (1). In wireless communication with the temporary MAC address (Mat), the code data written in the RAM (105) is read out, the code data is decoded with the public key (Ka pub) stored in the ROM (103) to generate a temporary MAC address (Mat), and the wireless communication is performed by using the generated temporary MAC address (Mat), so that wireless communication is performed by using a temporary MAC address (Mat) different from the unique MAC address (Ma) stored in the ROM (103). Therefore, since the secrecy to an interceptor can be maintained, the privacy of a user can be protected.

Further, the code data obtained by encoding the temporary MAC address (Mat) is acquired from the MAC distributing server device (20), and the acquired code data is written in the RAM (105) in the wireless LAN card (1). When wireless communication is performed by the temporary MAC address (Mat), the code data is read from the RAM (105), the read code data is decoded with the public key (Ka pub) stored in the ROM (103), and wireless communication is performed by using the decoded temporary MAC address (Mat). Therefore, since the uniqueness of the temporary MAC address (Mat) can be maintained, cross talk in wireless communication can be prevented.

Figure 5:
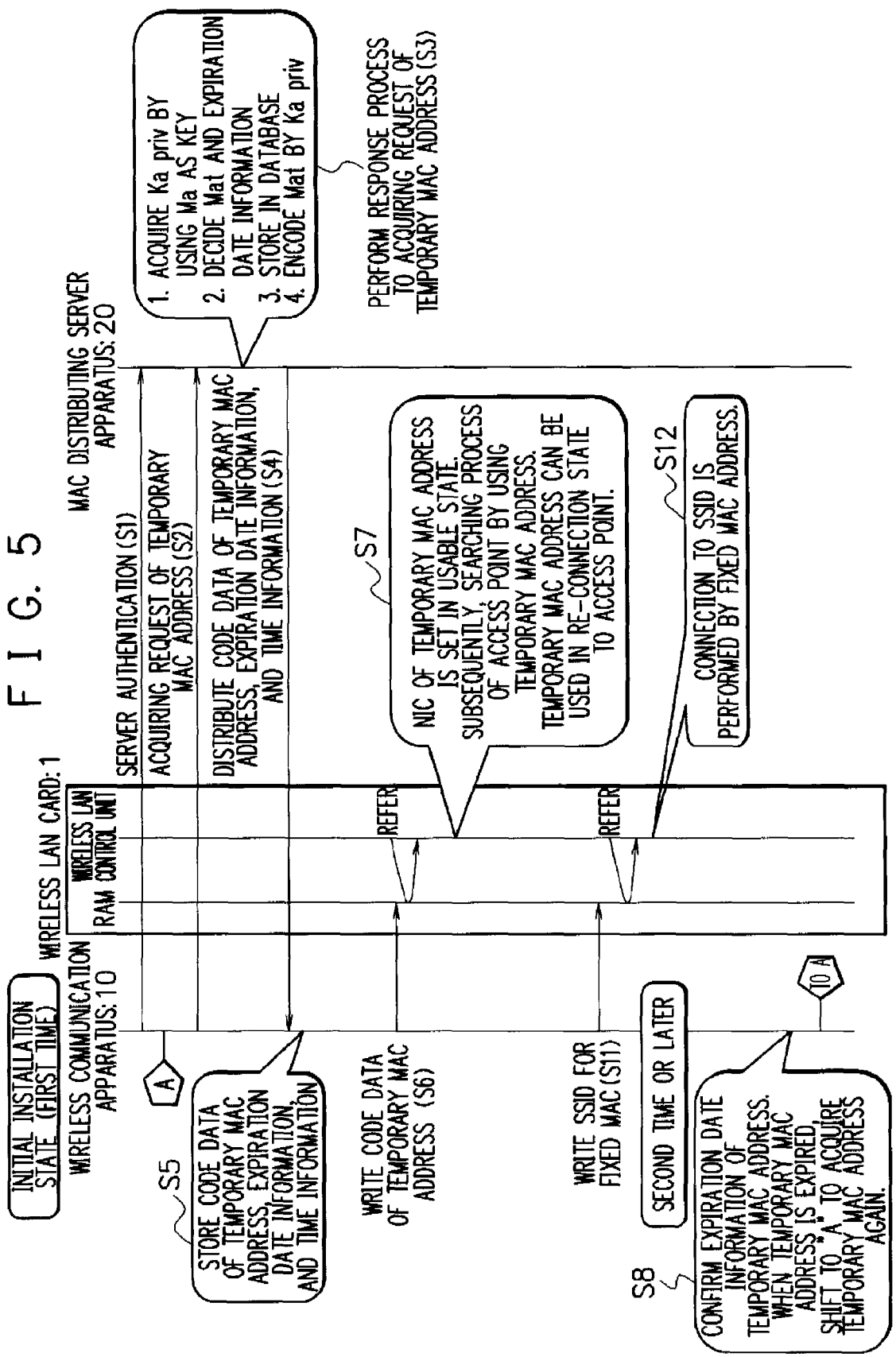
FIG. 5 is a second diagram showing a series of processing operations in the MAC address management system.

The wireless communication device (10) can also be structured as follows. That is, as shown in FIG. 5, a unique MAC address of a specific SSID (Service Set Identifier) is written in the RAM (105) (step S11), and a connection to the specific SSID (Service Set Identifier) is controlled with the unique MAC address written in the RAM (105) (step S12).

When the wireless LAN card (1) accesses an access point by using the temporary MAC address (Mat), as shown in FIG. 3, control is performed to connect a second NIC with the control unit (11). When the wireless LAN card (1) accesses an access point by using the unique MAC address (Ma), control is performed to connect a first NIC with the control unit (11).

Second Embodiment

A second embodiment will be described below.

Figure 6:
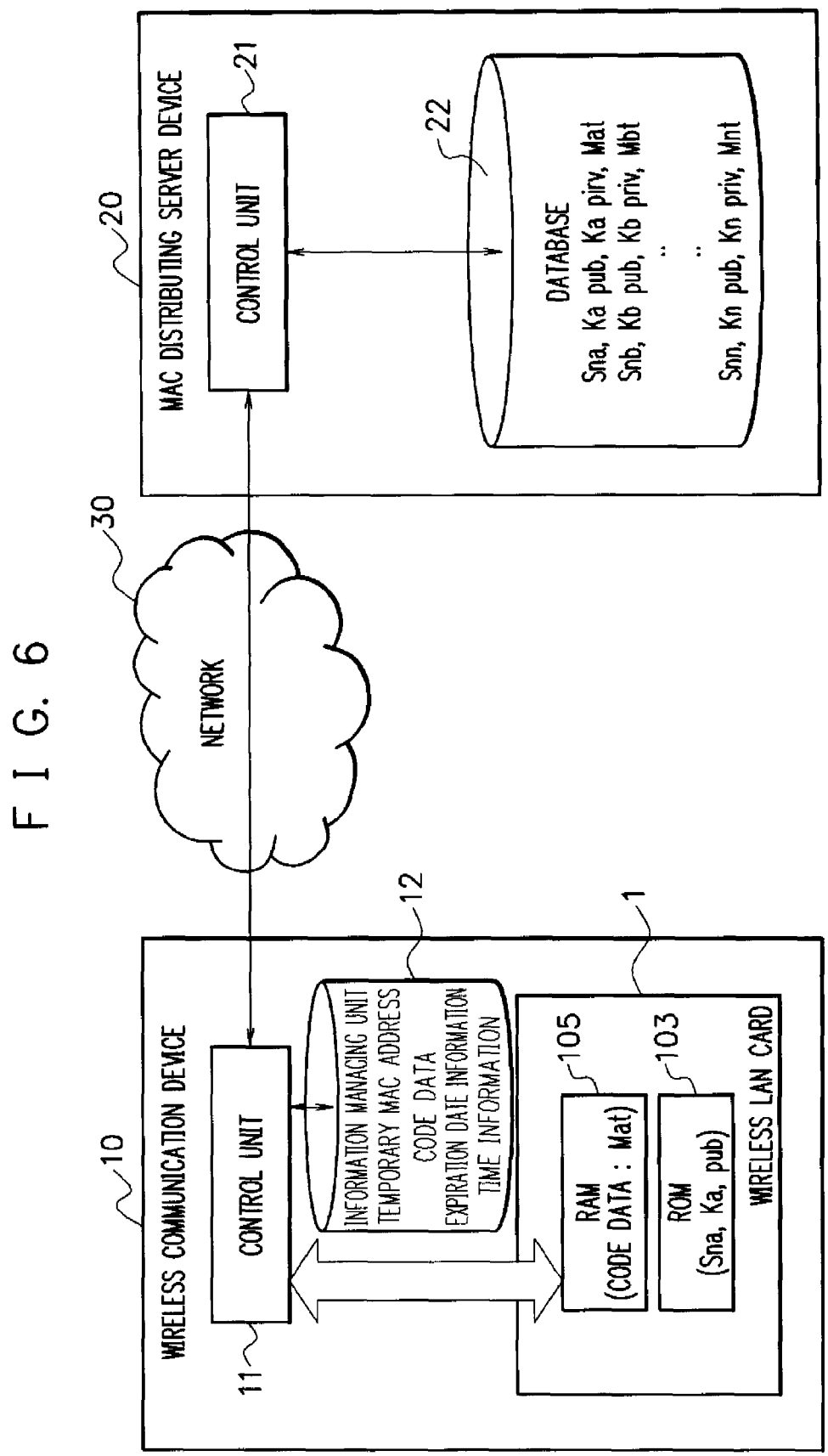
FIG. 6 is a diagram showing a system configuration of a MAC address management system according to a second embodiment.

In the MAC address management system according to the first embodiment, as shown in FIG. 1, the unique MAC address (Ma) and the public key (Ka pub) are stored in the ROM (103) of the wireless LAN card (1), and the unique MAC addresses (Ma to Mn), the public keys (Ka pub to Kn pub), the private keys (Ka pirv to Kn pirv), and the temporary MAC addresses (Mat to Mnt) are stored in the database (22) of the MAC distributing server device (20). The wireless communication device (10) acquires from the MAC distributing server device (20) the code data obtained by encoding the temporary MAC address (Mat) allocated to each unique MAC address (Ma). However, in a MAC address management system according to the second embodiment, as shown in FIG. 6, a serial number (Sna) unique to each device and a public key (Ka pub) are stored in a ROM (103) of wireless LAN card (1), and serial numbers (Sna to Snn), public keys (Ka pub to Kn pub), private keys (Ka pirv to Kn pirv), and temporary MAC addresses (Mat to Mnt) are stored in the database (22) of the MAC distributing server device (20), and the wireless communication device (10) acquires from a MAC distributing server device (20) code data obtained by encoding the temporary MAC address (Mat) allocated to each serial number (Sna). In this manner, the system is structured such that the temporary MAC address (Mat) is allocated by using the serial number (Sna).

The spirit and scope of the present invention is not limited to the embodiments described above. Variations of the embodiments can be executed without departing from the spirit and scope of the invention.

For example, in the embodiments described above, different code keys are used depending on wireless LAN cards (1). However, the system can also be structured such that a common code key is used.

In the embodiments described above, the MAC distributing server device (20) encodes a temporary MAC address (Mat) by using a private key (Ka priv), and the encoded code data is distributed to the wireless communication device (10). In the wireless communication device (10), code data is decoded by using a public key (Ka pub) stored in the ROM (103), and wireless communication is performed with the decoded temporary MAC address (Mat). However, a method of encoding and decoding the temporary MAC address (Mat) is not limited to the cryptographic scheme in the embodiments described above. The system can be structured by using any cryptographic schemes such that a temporary MAC address is encoded and decoded.

Figure 7:
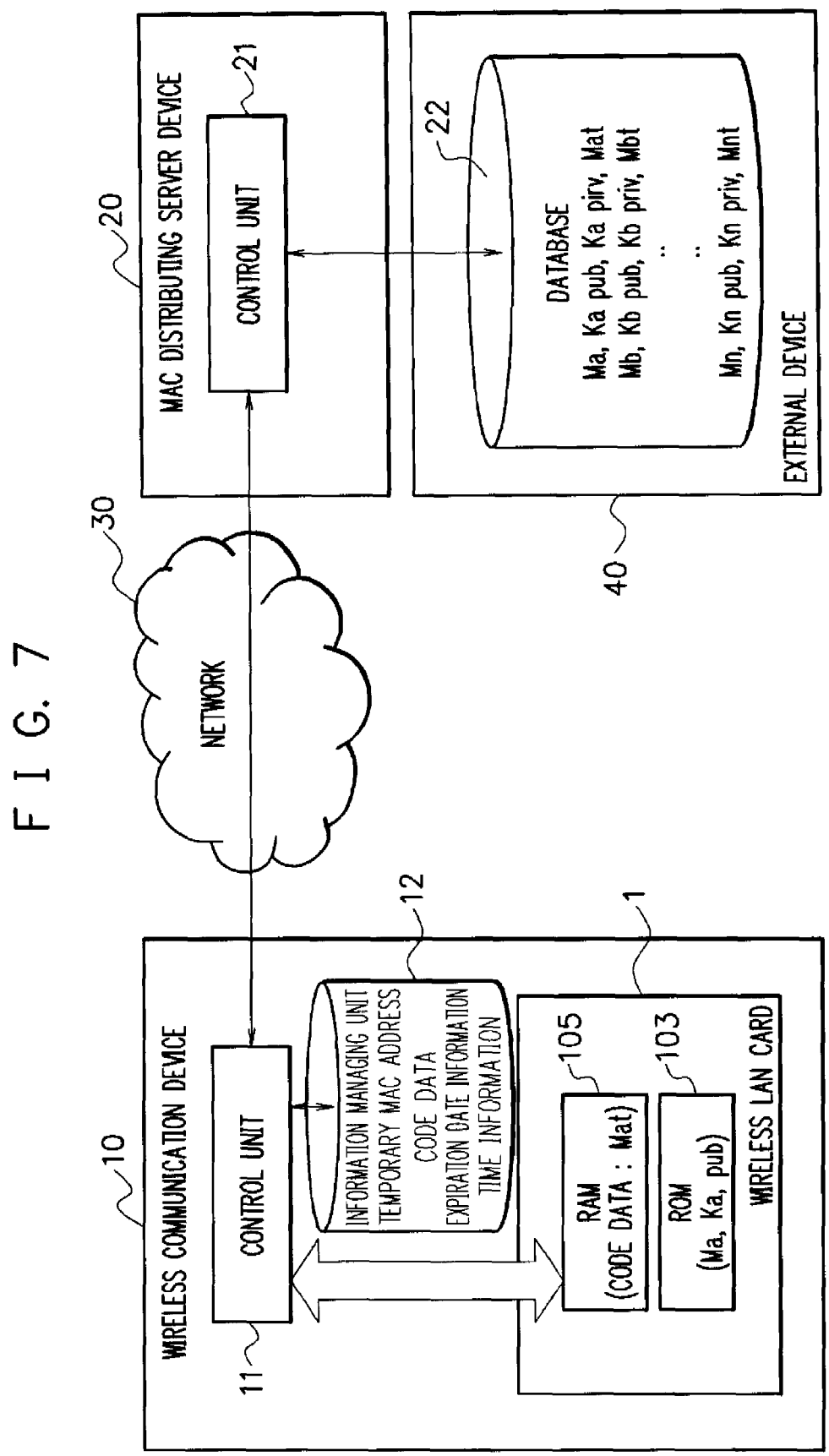
FIG. 7 is a diagram showing another configuration of a MAC distributing server device (20) constituting the MAC address management system.
Figure 8:
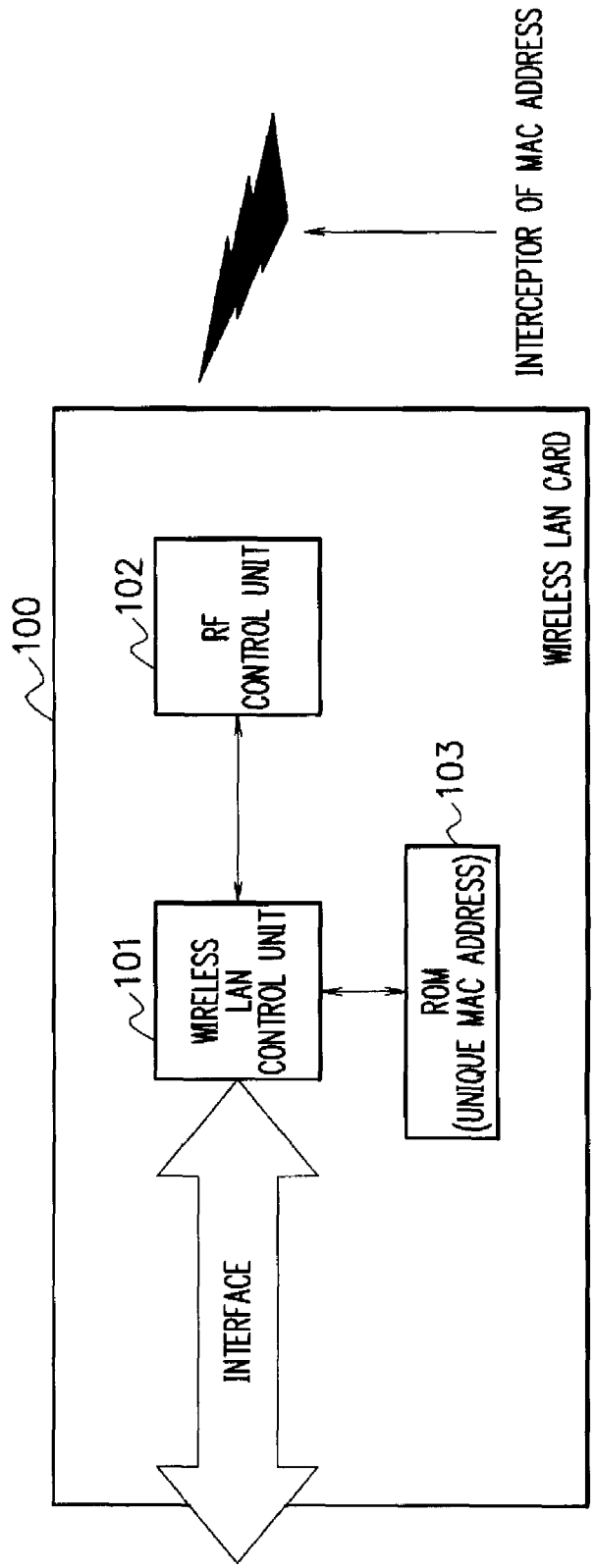
FIG. 8 is a first diagram showing an internal configuration of a conventional wireless LAN card.
Figure 9:
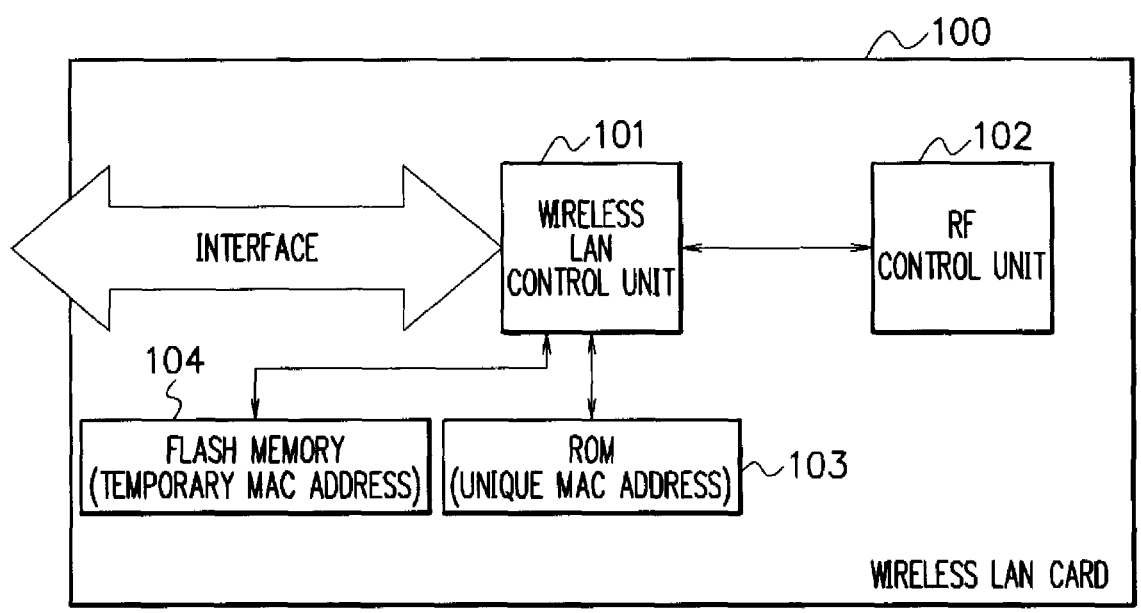
FIG. 9 is a second diagram showing the internal configuration of the conventional wireless LAN card.

The MAC distributing server device (20) constituting the MAC address management system shown in FIG. 1 includes the database (22). However, the MAC address management system may be structured as follows. That is, as shown in FIG. 7, the database (22) is isolated and separated from the MAC distributing server device (20), the database (22) is mounted in an external device (40), and information is acquired from the database (22).

Control operations in the wireless communication device (10) and the MAC distributing server device (20) that constitute the MAC address management system in FIG. 1 can be executed by not only a hardware configuration but also software such as a computer program. The program is recorded on a recording medium such as an optical recording medium, a magnetic recording medium, a magnetic optical recording medium, or a semiconductor, and the program is loaded from the recording medium into a communication device to cause the communication device to execute the control operations. The program may be loaded from an external device into the communication device through a predetermined network to cause the communication device to execute the control operations.

The wireless communication device, the MAC address management system, the wireless communication method, and the wireless communication program according to the embodiments can be applied to a service which performs wireless communication with a temporary MAC address which can be temporarily used.

What is claimed is:

1. A wireless communication device that obtains a temporary Media Access Control (MAC) address, that is used for performing wireless communication through an access point, from a distributing server device provided in a network storing the temporary MAC address corresponding to a unique MAC address and transmitting code data of the temporary MAC address encoded by a secret encryption key corresponding to the unique MAC address to the wireless communication device, comprising:

a code data acquiring section that acquires the code data of the temporary MAC address from the distributing server device by transmitting the unique MAC address given to the wireless communication device, and stores the code data of the temporary MAC address in a Random Access Memory (RAM) of the wireless communication device; and a wireless communication section that decodes the code data of the temporary MAC address by using a public encryption key pre-stored in a Read Only Memory (ROM) of the wireless communication device only when performing the wireless communication using the temporary MAC address, wherein the temporary MAC address, the unique MAC address, the public encryption key and the secret encryption key are managed in relation to each other in the distributing server device.

2. The wireless communication device according to claim 1, wherein the code data acquiring section acquires from the distributing server device the code data of the temporary MAC address and expiration date information representing a period during which the code data of the temporary MAC address is valid, and stores the expiration date information together with the code data of the temporary MAC address in the RAM; and the wireless communication section decodes the code data of the temporary MAC address during the valid period indicated by the expiration date information for performing the wireless communication using the temporary MAC address, and requests the code data acquiring section to acquire new code data of the temporary MAC address from the distributing server device when the valid period of the code data of the temporary MAC address indicated by the expiration date information has expired.

3. The wireless communication device according to claim 2, wherein the temporary MAC address managed in the distributing server device corresponds to a serial number unique to the wireless communication device and encoded by a secret encryption key corresponding to the serial number when transmitted to the wireless communication device, and the code data acquiring section acquires from the distributing server device the code data of the temporary MAC address by transmitting the serial number, wherein the temporary MAC address, the serial number, the public encryption key and the secret encryption key are managed in relation to each other in the distributing server device.

4. The wireless communication device according to claim 2, wherein the code data acquiring section acquires from the distributing server device time information in addition to the expiration data information for updating time synchronization between the wireless communication device and the distributing server device.

5. A Media Access Control (MAC) address management system for providing a temporary MAC address that is used by a wireless communication device for performing wireless communication through an access point comprising:

a distributing server device that is provided in a network, manages the temporary MAC address, a unique MAC address, a public encryption key pre-stored in the wireless communication device and a secret encryption key corresponding to the unique MAC address in relation to each other, encodes the temporary MAC address corresponding to the unique MAC address of the wireless communication device by the secret encryption key corresponding to the unique MAC address, and transmits the encoded code data of the temporary MAC address to the wireless communication device; and the wireless communication device that acquires the temporary MAC address from the distributing server device, wherein the wireless communication device comprises:

a code data acquiring section that acquires from the distributing server device the code data of the temporary MAC address by transmitting the unique MAC address given to the wireless communication device, and stores the code data of the temporary MAC address in a Random Access Memory (RAM) of the wireless communication device; and a wireless communication section that decodes the code data of the temporary MAC address by using a the public encryption key pre-stored in a Read Only Memory (ROM) of the wireless communication device only when performing the wireless communication using the temporary MAC address.

6. The MAC address management system according to 10, wherein the code data acquiring section acquires from the distributing server device the code data of the temporary MAC address and expiration date information representing a period during which the code data of the temporary MAC address is valid, and stores the expiration date information together with the code data of the temporary MAC address in the RAM; and the wireless communication section decodes the code data of the temporary MAC address during the valid period indicated by the expiration date information for performing the wireless communication using the temporary MAC address, and requests the code data acquiring section to acquire new code data of the temporary MAC address from the distributing server device when the valid period of the code data of the temporary MAC address indicated by the expiration date information has expired.

7. The MAC address management system according to claim 6, wherein the distributing server device manages the temporary MAC address, a serial number unique to the wireless communication device, a public encryption key pre-stored in the wireless communication device and a secret encryption key corresponding to the serial number in relation to each other, and encodes the temporary MAC address corresponding to the serial number by a secret encryption key corresponding to the serial number for transmitting to the wireless communication device, and the code data acquiring section acquires from the distributing server device the code data of the temporary MAC address by transmitting the serial number.

8. The MAC address management system according to claim 6, wherein the code data acquiring section acquires from the distributing server device time information in addition to the expiration data information for updating time synchronization between the wireless communication device and the distributing server device.

9. A wireless communication method of a Media Access Control (MAC) address management system in which a wireless communication device acquires a temporary MAC address, that is used for performing wireless communication through an access point, from a distributing server device provided in a network storing the temporary MAC address corresponding to a unique MAC address of the wireless communication device, the method comprising:

requesting, from the wireless communication device to the distributing server device, to send the temporary MAC address by transmitting the unique MAC address of the wireless communication device;

obtaining, in the distributing server device, the temporary MAC address corresponding to the unique MAC address received from the wireless communication device, coding the temporary MAC address by a secret encryption key corresponding to the unique MAC address, and transmitting code data of the temporary MAC address to the wireless communication device;

storing, in the wireless communication device, the code data of the temporary MAC address in a Random Access Memory (RAM) of the wireless communication device; and decoding, in the wireless communication device, the code data of the temporary MAC address by using a public encryption key pre-stored in a Read Only Memory (ROM) of the wireless communication device only when performing the wireless communication using the temporary MAC address, wherein the temporary MAC address, the unique MAC address, the public encryption key and the secret encryption key are managed in relation to each other in the distributing server device.

10. The wireless communication method according to claim 9, wherein the obtaining step includes obtaining expiration date information corresponding to the temporary MAC address and representing a period during which the temporary MAC address is valid, and transmitting the expiration date information together with the code data of the temporary MAC address to the wireless communication device, wherein the storing step includes storing the expiration date information together with the code data of the temporary MAC address in the RAM, and wherein the decoding step includes decoding the code data of the temporary MAC address during the valid period indicated by the expiration date information for performing the wireless communication using the temporary MAC address, and acquiring new code data of the temporary MAC address from the distributing server device when the valid period of the code data of the temporary MAC address indicated by the expiration date information has expired.

11. The wireless communication method according to claim 10, wherein obtaining step comprises obtaining the temporary MAC address associated with a serial number unique to the wireless communication device and encoding the temporary MAC address by a secret encryption key corresponding to the serial number, wherein the temporary MAC address, the serial number, the public encryption key and the secret encryption key are managed in relation to each other in the distributing server device.

12. The wireless communication method according to claim 10, wherein the distributing server device transmits time information in addition to the expiration data information for updating time synchronization between the wireless communication device and the distributing server device.

13. A computer-readable non-transitory recording medium having embodied thereon a computer program, which when executed by a computer, causes the computer to function as a wireless communication device that obtains a temporary Media Access Control (MAC) address, that is used for performing wireless communication through an access point, from a distributing server device provided in a network storing the temporary MAC address corresponding to a unique MAC address and transmitting code data of the temporary MAC address encoded by a secret encryption key corresponding to the unique MAC address to the wireless communication device, the wireless communication device comprising:

a code data acquiring section that acquires the code data of the temporary MAC address from the distributing server device by transmitting the unique MAC address given to the wireless communication device, and stores the code data of the temporary MAC address in a Random Access Memory (RAM) of the wireless communication device, and a wireless communication section that decodes the code data of the temporary MAC address by using a public encryption key pre-stored in a Read Only Memory (ROM) of the wireless communication device only when performing the wireless communication using the temporary MAC address, wherein the temporary MAC address, the unique MAC address, the public encryption key and the secret encryption key are managed in relation to each other in the distributing server device.

14. A computer-readable non-transitory recording medium according to claim 13, wherein the code data acquiring section acquires from the distributing server device the code data of the temporary MAC address and expiration date information representing a period during which the code data of the temporary MAC address is valid, and stores the expiration date information together with the code data of the temporary MAC address in the RAM; and the wireless communication section decodes the code data of the temporary MAC address during the valid period indicated by the expiration date information when the code data is judged valid based on the expiration date information, and performs for performing the wireless communication using a decoded the temporary MAC address, and requests the code data acquiring section to acquire new code data of the temporary MAC address from the distributing server device when the valid period of the code data of the temporary MAC address indicated by the expiration date information has expired.

15. A computer-readable non-transitory recording medium according to 14, wherein the temporary MAC address managed in the distributing server device corresponds to a serial number unique to the wireless communication device and encoded by a secret encryption key corresponding to the serial number when transmitted to the wireless communication device, and the code data acquiring section acquires from the distributing server device the code data of the temporary MAC address by transmitting the serial number, wherein the temporary MAC address, the serial number, the public encryption key and the secret encryption key are managed in relation to each other in the distributing server device.

\* \* \* \* \*